United States Patent Office 2,753,831
Patented July 10, 1956

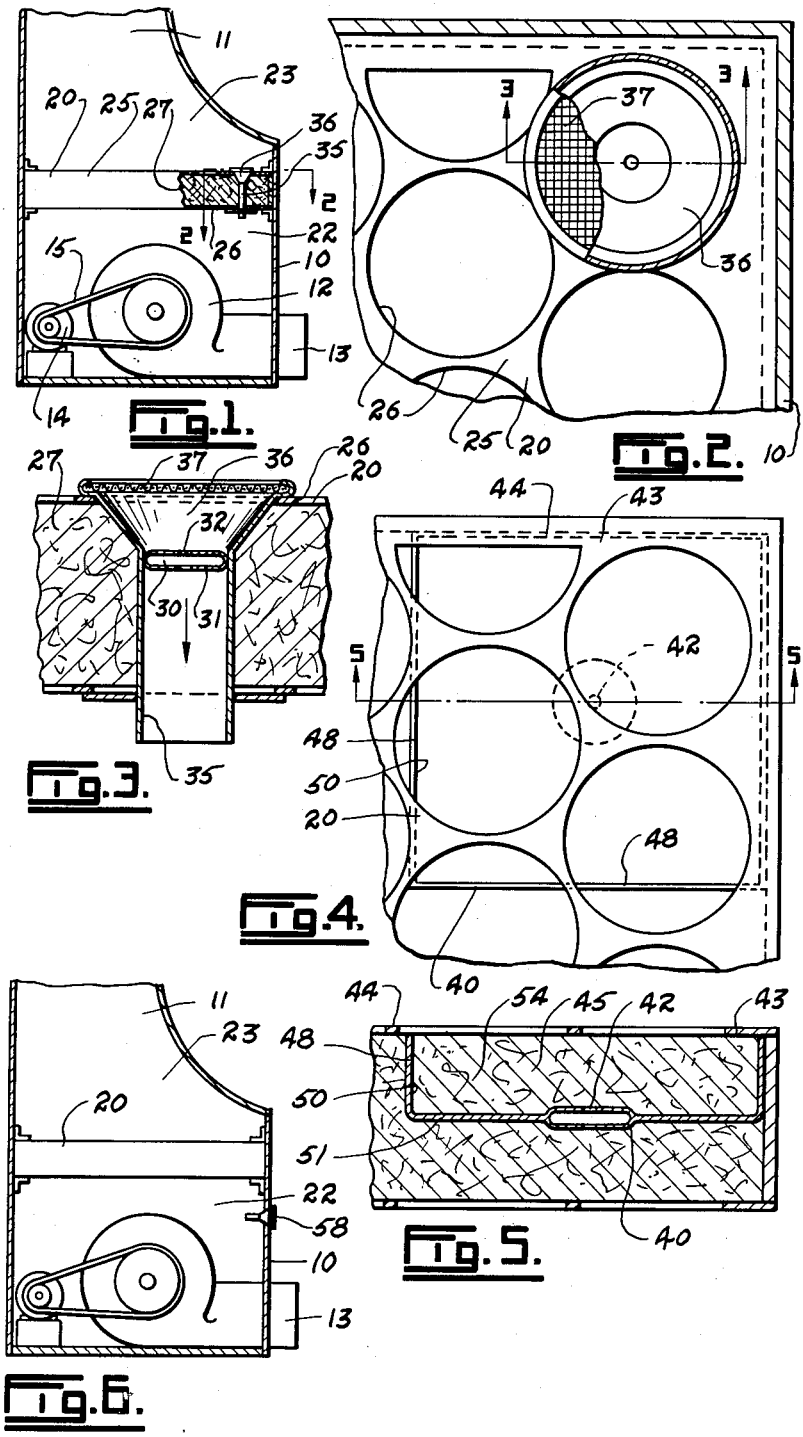

2,753,831

AIR FILTER CLOGGING WARNING APPARATUS

Walter B. Davies, New Westminster, British Columbia, Canada

Application May 10, 1952, Serial No. 287,153

4 Claims. (Cl. 116—112)

This invention relates to air filter clogging warning apparatus.

This invention is particularly designed for air filtering apparatus in heating equipment, but it may be used in any air filtering equipment.

Air filter apparatus for equipment used in heating houses, buildings and the like usually includes a suction fan for drawing air from the house or building through a filter and directing it to the heating device. The purpose of the filter is to remove dust and particles from the air so that it soon becomes clogged up. However, this is not usually noticed for some time as the only indication is the time it takes to raise the temperature in the house or building. Equipment has been developed for indicating when a filter is clogged, but it is obvious that this has not been successful or practical since it is not on the market.

The main purpose of the present invention is the provision of apparatus for providing a warning when the filter clogs up to a certain point, but before it is completely clogged.

Another object is the provision of apparatus for creating an audible signal when the filter clogs which will remain in operation as long as the filter remains in that state.

The filter clogging warning apparatus according to this invention comprises a signal device having a small hole therein through which air is moved to operate the signal. One side of the signal device communicates with a low pressure area between the fan and the filter, and the other side thereof communicates with an area of higher pressure. The signal device may be positioned in a wall of the casing in which the fan and filter are located, in which case one side of it communicates with the atmosphere outside the casing. On the other hand, the signal device may be located in the filter itself with one side communicating with the area between the fan and the filter, and the other side opening out on the opposite side of the filter. The hole of the signal device is so small in comparison to the size of the filter that it is not likely to become clogged, but if desired, suitable means may be provided for preventing this.

In the accompanying drawings,

Figure 1 is a vertical section through air filter apparatus showing the signal device in the filter, Figure 2 is an enlarged sectional view taken on the line 2—2 of Figure 1, showing part of the filter in plan, Figure 3 is a vertical section taken on the line 3—3 of Figure 2, Figure 4 is an enlarged plan view of a filter illustrating an alternative form of the invention, Figure 5 is a vertical section taken on the line 5—5 of Figure 4, and Figure 6 is a view similar to Figure 1 showing the signal device mounted in the casing wall.

Referring to Figure 1, 10 is a casing having an air inlet 11 at the top thereof, said inlet being connected to the rooms with which this apparatus is being used in any convenient manner. A suction fan 12 is located at the bottom of the casing and has an outlet pipe 13 which is connected to a heating device or directly to said rooms. The fan is operated in any suitable manner, such as by means of an electric motor 14 which drives it through a belt 15. An air filter 20 of any desired type is removably fitted in the casing above the fan. This forms an area of low pressure 22 between the filter and the fan, and an area of higher pressure 23 on the side of the filter remote from the fan.

As stated above, the filter 20 may be of any desired type or construction. For the purpose of illustration, the filter shown consists of a rectangular housing 25 having a plurality of holes 26 in the top and bottom thereof, said housing being filled with a suitable filter material 27.

In the form of the invention in Figures 1 to 3, a signal device is located in the filter. In this example, the signal device includes a whistle 30 in the form of a hollow capsule 31 having a small hole 32 extending through the central portion of the top and bottom thereof. As the filter is relatively thick, this whistle is located in a tube 35 which extends through the filter material and opens outwardly on the opposite sides of the filter. This tube is, of course, considerably larger in cross sectional area than the hole 32. It is helpful to form the tube with a flared end at the entrance thereof to form a funnel 36 opening out at the top of the filter which faces the higher pressure area 23 of the filter apparatus. If desired, a screen 37 may be placed over the entrance of the funnel and tube, the mesh of the screen being such that the holes therein are smaller than the hole 32 of the whistle.

During normal operation, the fan 12 sucks air from the casing entrance 11 through the filter 20 and discharges it through the pipe 13. The filter removes dust and particles from the air. The hole 32 of the signal device is so small in relation to the arear of the filter that little or no air passes through it when the filter is clean. However, as the filter begins to clog up with the particles removed from the air, more and more air will pass through the signal device hole until it reaches a point where it is sufficient to cause the signal device to operate and create an audible signal. This takes place before the filter is completely clogged in order to maintain efficiency of the filter apparatus as high as possible.

The entrance to the tube 35 is considerably larger in cross section than the signal device hole 32. In fact, the entrance may be approximately two hundred times larger than the hole. In view of this, the only air entering the tube is that which is sucked through the signal device only. The screen 37 prevents the passage of any particles large enough to stop the hole, and this screen cannot be clogged before the clogging of the filter reaches such a stage that the signal starts to operate. The reason for this is that the hole area of the tube or funnel entrance is so much larger than that of the whistle hole.

Referring to Figures 4 and 5, a signal device 40 consisting of a hollow capsule having a central hole 42 therethrough is located in a filter 43 spaced from the top 44 thereof. This filter is constructed in the same manner as the filter 20 previously described, and it includes a suitable filter material 45 therein. A baffle 48 is positioned in the filter at the warning device. In this example, the baffle consists of a wall 50 extending from one side to the other of the filter at a corner thereof, see Figure 4, and a bottom 51 in which the signal device 40 is located so that the hole of the latter opens through said bottom. Actually, the baffle forms a compartment 54 which is filled with the filter material 45.

The only air passing through the filter material within the compartment 54 is that drawn through the signal device hole 42. This means that the filter material in this compartment cannot possibly clog up with dirt before or at the same time as the material of the rest of the filter. As the main body of the filter material starts to clog up, more air will be drawn through the hole 42 until the warning device creates an audible sound. The warning device will continue to operate as long as the filter is left in the apparatus.

Figure 6 includes the filter apparatus shown in Figure 1, but the signal device is not located in the filter 20. In this example, a signal device 58 similar to that shown in Figures 1 to 3 is mounted on a wall of the casing 10 and opens outwardly therethrough. The inner end of the signal device communicates with the low pressure area 22 in the casing, while its outer end communicates with the atmosphere outside the casing, the pressure of which is higher than that in the area 22. As the hole in the signal device is so much smaller than the total area of the filter, very little if any air enters the casing through the hole until the filter starts to clog up. The signal device emits an audible signal when sufficient air is drawn therethrough for this purpose.

While a capsule-type whistle has been shown, it is obvious that any other sound emitting device may be used that is operated by air moving therethrough, such as a reed device. In fact, any signal device may be used which is operable by the flow of air.

What I claim as my invention is:

1. In air filter apparatus having a suction fan for drawing air through a main filter located in a casing with a low pressure area between the fan and the filter, filter clogging warning apparatus comprising a tube extending through the main filter and opening into the low pressure area of the apparatus, a signal device extending across the tube and having a small hole therein through which air is moved to operate the signal, and air filtering means extending across the tube on the side of the signal device remote from the low pressure area, the cross sectional area of the air filter means being many times greater than that of the signal device hole and much smaller than that of the main filter, whereby the only air drawn through the filter means is that sucked through the signal device hole so that said filter means cannot be clogged before the main filter.

2. Filter clogging warning apparatus as claimed in claim 1 in which the air filtering means in the tube is a screen, the holes of which are smaller than the signal device hole.

3. Filter clogging warning apparatus as claimed in claim 1 in which the end of the tube remote from that opening into the low pressure area flares outwardly to form a funnel across which the air filtering means extends.

4. In air filter apparatus having a suction fan for drawing air through a main filter located in a casing with a low pressure area between the fan and the filter, filter clogging warning apparatus comprising a signal device in the filter material of the main filter and spaced from the face of said filter remote from the low pressure area, said device having a small hole therein through which air is moved to operate the signal, and a baffle in the main filter at the signal device for preventing air from passing through a relatively large portion of the filter, the hole of the signal device opening through the baffle and being much smaller than said relatively large portion of the filter, whereby the only air drawn through said relatively large portion of the filter is that sucked through the signal device hole so that said filter portion cannot be clogged before the rest of the filter.

References Cited in the file of this patent

UNITED STATES PATENTS

| | | |
|---|---|---|
| 1,770,094 | Wickersham | July 8, 1930 |
| 1,926,688 | Schaal | Sept. 12, 1933 |
| 2,230,113 | Hein | Jan. 28, 1941 |
| 2,629,572 | Grinnan | Feb. 24, 1953 |
| 2,682,250 | Ulrich | June 29, 1954 |

FOREIGN PATENTS

| | | |
|---|---|---|
| 42,636 | Netherlands | Jan. 16, 1938 |
| 345,440 | Great Britain | Mar. 26, 1931 |